W. RICHMAN.
WHEELBARROW.
APPLICATION FILED SEPT. 20, 1920.
1,383,026.
Patented June 28, 1921.
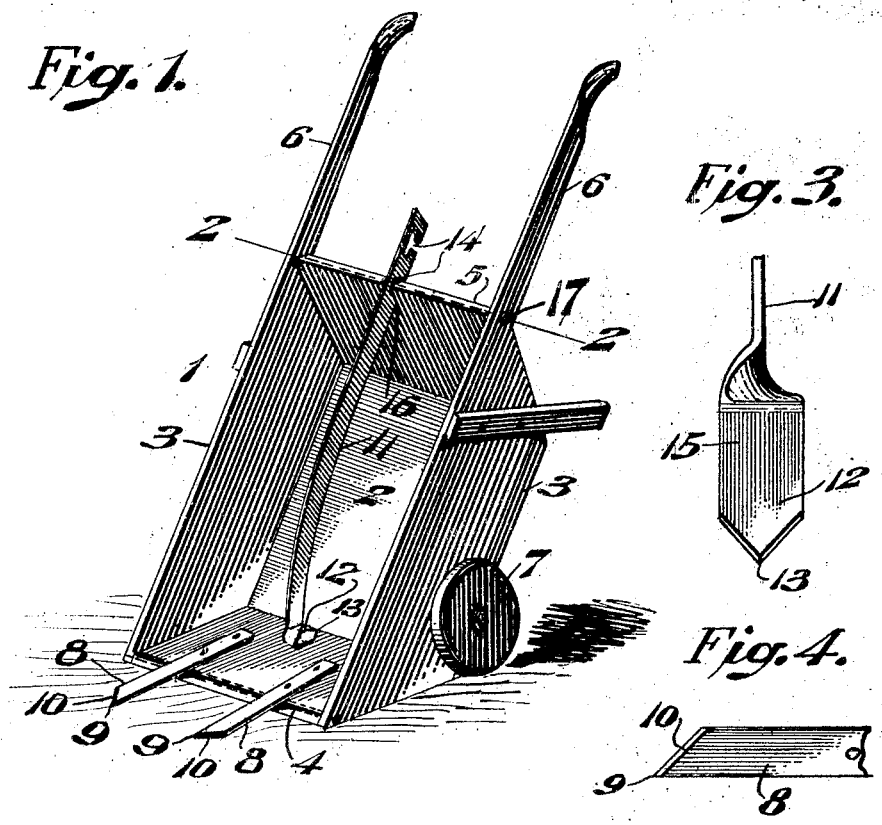
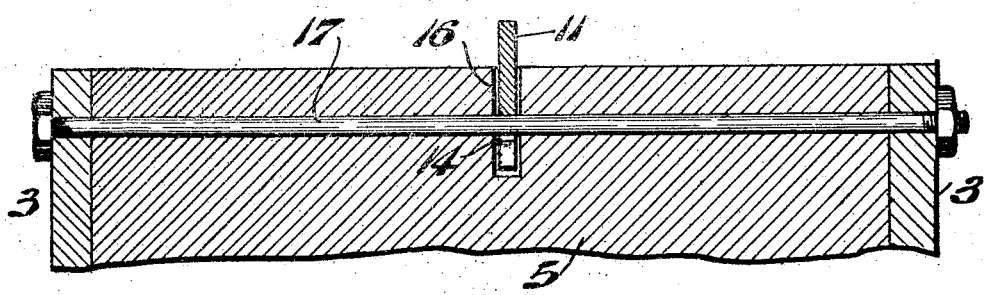
INVENTOR:
Wilbert Richman
BY
Diederheim & Fairbanks
ATTORNEYS.

UNITED STATES PATENT OFFICE.

WILBERT RICHMAN, OF BRIDGETON, NEW JERSEY.

WHEELBARROW.

1,383,026.   Specification of Letters Patent.   Patented June 28, 1921.

Application filed September 20, 1920. Serial No. 411,469.

*To all whom it may concern:*

Be it known that I, WILBERT RICHMAN, a citizen of the United States, residing at Bridgeton, in the county of Cumberland, State of New Jersey, have invented a new and useful Wheelbarrow, of which the following is a specification.

My invention consists of a vehicle of the order of a wheelbarrow which is provided with means for engaging easily and effectively a barrel, box or other receptacle or other load and guiding it to the body of the wheelbarrow upon which it may then be imposed and held.

It consists also of a dog of novel construction which is adapted to take hold of the receptacle after being seated on said body and so control it as to be prevented from shifting thereon.

It consists also of novel means for mounting said dog on the body, and further of novel means for adapting it to be adjusted to the size of said receptacle.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a wheelbarrow embodying my invention.

Fig. 2 represents a transverse section of a portion on line 2—2 Fig. 1, on an enlarged scale.

Fig. 3 represents a perspective view of a portion of the dog, on an enlarged scale.

Fig. 4 represents a plan view of a detached member of the device, on an enlarged scale.

Similar numerals of reference indicate corresponding parts in the figures.

Referring to the drawings, 1 designates a wheelbarrow the body of which is composed of the bottom 2, the sides 3, the front wall 4, the rear wall 5, handles 6, wheels or rollers 7, and which members in the main, excepting the features of my invention applied thereto are of usual construction.

Connected with the front wall 4 are the arms 8 which are formed of bars or plates of metal or other strong material which are riveted, screwed, bolted, or otherwise firmly connected with said wall, and when the wheelbarrow is in normal position they extend upwardly from said wall.

The front edges of the arms are oblique transversely to the ends forming points 9 and have the upper faces of their edge portions sloping forming inclined planes 10. 11 represents a dog having on its front end a hook-like member which is pointed forming the sharp spur 12 whose point 13 is below and is adapted to engage the upper side of the receptacle to be wheeled, it being noticed that said dog is formed of a flat or narrow bar of wrought metal in whose rear portions are the T-shaped slots 14 which extend vertically in said bar, and the front portion of said bar is twisted angularly downwardly in a direction transverse to said bar forming said hook-like member and spur, said hook-like member being made wide as at 15 for the purpose of strength and an increase of holding surface on the receptacle.

In the upper end of the rear wall of the body is the vertically extending slot or recess 16 which is open at the top, and said slot is traversed by the rod or bolt 17 which is passed through the side and rear walls of the body and provided with a head and a nut at opposite ends whereby when said nut is tightened said rear and side walls are firmly clamped together, and the portion of the bolt within said slot is utilized as the axis of the dog, it being mounted thereon at either of its slots 14, a plurality of slots being provided so that the dog may be set in adjusted position on the bolt 17 relatively to the requirement of engagement with the receptacle.

The operation is as follows:—

The body is raised on its axle so that the front wall thereof is placed adjacent to the floor or ground on which the wheelbarrow is used, the arms being now in comparatively horizontal position and projecting toward the receptacle to be wheeled. The wheelbarrow is now pushed forward and the arms pass under the receptacle, the pointed ends and the inclined planes of the arms permitting said arms to ride easily and unobstructed under and against the bottom of the receptacle and so part of the receptacle is imposed on said arms. Then the receptacle is turned on the tops of the sides of the body as a fulcrum and so placed on the latter when the body is lowered on its axle. The front of the dog may now be thrown over the top of the receptacle so that its spur engages with the same and so takes hold of the receptacle lockingly as to prevent displacement of the latter from the wheelbarrow. The receptacle may now be wheeled to a desired place when the dog is disengaged from the load and the latter may be readily dumped or otherwise removed from the wheelbarrow.

Having thus described my invention what I claim as new and desire to secure by Letters Patent, is:—

1. In a vehicle of the order stated, a body, a load engaging dog, and means for mounting the latter on the former, said dog consisting of a narrow bar twisted transversely in its length and having its front portion extending angularly downward presenting its broad side to a load.

2. In a vehicle of the order stated, a body having sides and a rear wall, a load engaging dog, the latter having in its rear end a slot which is adapted to receive a bolt as the axis of the dog, said rear wall having in it a vertical recess which is traversed by said bolt, the heel end of said dog being adapted to freely occupy said recess with the walls of said slot freely mounted on said bolt.

3. In a vehicle of the order stated, a body having sides and a rear wall, a load engaging dog, the latter having in its rear end a slot which is adapted to receive a bolt as the axis of the dog, said rear wall having in it a vertical recess which is traversed by said bolt, the heel end of said dog being adapted to freely occupy said recess with the walls of said slot freely mounted on said bolt, said dog being formed of a narrow bar twisted transversely in its length presenting at the front end of the dog the broad side of the bar to the load.

WILBERT RICHMAN.

Witnesses:
   CHAS. C. WOODRUFF,
   M. C. CRESSE.